(12) United States Patent
Hatada et al.

(10) Patent No.: US 6,284,349 B1
(45) Date of Patent: Sep. 4, 2001

(54) IMAGE TRANSFER SHEET, PREPARATION METHOD THEREOF AND IMAGE FORMATION METHOD AND IMAGE TRANSFER METHOD USING THE IMAGE TRANSFER SHEET

(75) Inventors: Shigeo Hatada; Keishi Taniguchi, both of Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/313,773

(22) Filed: May 18, 1999

(30) Foreign Application Priority Data

May 19, 1998 (JP) .................................................. 10-153966

(51) Int. Cl.[7] ...................................................... B32B 3/00

(52) U.S. Cl. ............................ 428/195; 427/149; 427/256

(58) Field of Search ..................................... 428/195, 201, 428/220; 427/149, 256

(56) References Cited

U.S. PATENT DOCUMENTS 5,958,560 * 9/1998 Ewan ................................... 428/201

* cited by examiner

*Primary Examiner*—Bruce H. Hess
*Assistant Examiner*—Michael E. Grendzynski
(74) *Attorney, Agent, or Firm*—Oblon, Spivak, McClelland, Maier & Neustadt, P.C.

(57) ABSTRACT

An image transfer sheet has a support with water permeability, and a releasing layer, an adhesive layer and an image transfer layer which are successively overlaid in this order on the support, the adhesive layer having a surface covering area ratio of 90% or more with respect to a surface area of the image transfer layer when the image transfer sheet is immersed in water and the support is peeled away therefrom, or a surface covering area ratio of 40% or more with respect to a surface area of the releasing layer. A toner image is formed on the above-mentioned image transfer sheet by electrophotography, or a thermofusible ink image or a sublimable dye image is formed thereon, or an aqueous ink image or a thermofusible ink image is formed thereon by an ink jet printing method, and such an image formed on the image transfer sheet is transferred to an image receiving material.

41 Claims, 1 Drawing Sheet

(x30)

FIGURE
(x30)

IMAGE TRANSFER SHEET, PREPARATION METHOD THEREOF AND IMAGE FORMATION METHOD AND IMAGE TRANSFER METHOD USING THE IMAGE TRANSFER SHEET

BACKGROUND OF THE INVENTION

1. Field of the Invention

The present invention relates to an image transfer sheet for use in (1) an electrophotographic image formation process comprising a step of electrostatically transferring a toner image to an image transfer material serving as an image receiving material such as a sheet of plain paper, using an electrophotographic copying machine, (2) a thermal image transfer recording method comprising a step of imagewise transferring a thermofusible ink or a sublimable dye, using a printer, and (3) an ink jet printing method comprising a step of imagewise transferring an aqueous ink or a thermofusible ink, using a printer. The above-mentioned electrophotographic copying machine and printers are hereinafter collectively referred to as the copying apparatus.

The present invention also relates to an image transfer sheet on which images are formed by the copying apparatus and from which the images are transferred to other image-receiving members made of, for example, cloth, canvas, plastics, paper, wood, leather, glass, earthenware and metal.

The present invention also relates to an image formation method and an image transfer method, using the above-mentioned image transfer sheet.

2. Discussion of Background

In accordance with the recent spread and development of the copying apparatus, various trials have been made so as to find new applications and uses in the copying apparatus by utilizing its various functions and capabilities other than its originally intended use for reproducing images on a sheet of plain paper.

For example, there has been proposed a new use of the copying apparatus for transferring an image formed by the copying apparatus to an image-receiving member made of a material such as cloth, leather, canvas, plastics, wood, glass, earthenware or metal, and fixing the image thereto.

The above-mentioned new use is effective for the application to the manufacturing of clothes such as T-shirts, sweat shirts, aprons and jackets, cups, trays, stained glass, panels, and reproduced pictures which are not to be made by mass-production, but made to order, or designed to be sold on a small scale. Further, such demand has greatly expanded because a full-color electrophotographic copying apparatus capable of producing high quality color images is available and high quality images can be easily printed.

As an image transfer sheet for the above-mentioned applications, there is conventionally known an image transfer sheet for the formation of a transferred image, using a toner, a thermofusible ink, a sublimable dye or an aqueous ink, as disclosed, for example, in Japanese Laid-Open Patent Application 52-82509. Furthermore, there is also known an image transfer sheet which is provided with an adhesive layer comprising a delayed-tack-type adhesive agent.

The above-mentioned image transfer sheets, however, have a problem that when image transfer is performed, at least either heat or pressure has to be applied to the image transfer sheets and therefore, it is difficult to perform image transfer to a material which is not heat resistant, such as plastics, or an article with a curved surface to which it is difficult to apply uniform pressure.

Japanese Laid-Open Patent Application 8-108610 discloses a water-pressure image transfer sheet comprising a base paper having water permeability, a releasing layer, an adhesive layer, and an image holding layer. When using this water-pressure image transfer sheet, the water-pressure image transfer sheet is immersed in water after formation of an image onto the image holding layer. The releasing layer is dissolved in water and the base paper is then peeled away from the transfer sheet. Thus, a film-like material composed of the image-bearing image holding layer and the adhesive layer is caused to float on the surface of water and then transferred to an image receiving material. Neither heat nor pressure is required for image transfer of this type of water-pressure image transfer sheet.

However, wrinkling easily occurs on the surface of the image holding layer of the conventional water-pressure image transfer sheet, as shown in a single FIGURE. Due to such wrinkling of the image holding layer, the transferred image has poor and unattractive appearance as if a film is stuck on the image receiving material. There is a demand for an image transfer sheet free of wrinkling.

SUMMARY OF THE INVENTION

It is therefore a first object of the present invention to provide an image transfer sheet which comprises an image transfer layer free of wrinkling.

A second object of the present invention is to provide a method of preparing the above-mentioned image transfer sheet.

A third object of the present invention is to provide an image formation method capable of forming an image on the above-mentioned image transfer sheet.

A fourth object of the present invention is to provide an image transfer method of transferring an image formed on the above-mentioned image transfer sheet to an image receiving material with excellent image transfer performance, thereby obtaining high quality transferred image.

The above-mentioned first object of the present invention can be achieved by an image transfer sheet comprising a support having water permeability, and a releasing layer, an adhesive layer and an image transfer layer which are successively overlaid in this order on the support, the adhesive layer having a surface covering area ratio of 90% or more with respect to a surface area of the image transfer layer when the image transfer sheet is immersed in water and the support is peeled away therefrom.

The first object can also be attained by an image transfer sheet comprising a support having water permeability, and a releasing layer, an adhesive layer and an image transfer layer which are successively overlaid in this order on the support, the adhesive layer having a surface covering area ratio of 40% or more with respect to a surface area of the releasing layer.

In the aforementioned image transfer sheet, it is preferable that the adhesive layer comprise an acrylic pressure-sensitive adhesive.

The adhesive layer is preferably provided in a deposition amount of 1 g/m² to 30 g/m² on a dry basis.

The second object of the present invention can be achieved by a method of preparing the image transfer sheet comprising the step of providing the adhesive layer on the releasing layer using a coating liquid in the form of a solvent solution for the formation of the adhesive layer, or a coating liquid with a viscosity of $50 \times 10^{-3}$ Pa·s or more for the formation of said adhesive layer.

The third object of the present invention can be achieved by an image formation method of forming a toner image on the above-mentioned image transfer sheet serving as an image receiving material by electrophotography, and fixing the toner image to the image transfer sheet with the application of heat and/or pressure thereto.

Alternatively, the third object of the present invention can be achieved by an image formation method of forming an image on the above-mentioned image transfer sheet serving as an image receiving material by transferring a thermofusible ink layer or a sublimable dye imagewise to the image transfer sheet with the application of heat thereto, or an image formation method of forming an image on the image transfer sheet serving as an image receiving material by an ink jet printing method using an aqueous ink or a thermofusible ink.

The fourth object of the present invention can be achieved by an image transfer method of transferring to an image receiving material a toner image which is formed by electrophotography on the image transfer sheet and fixed thereto with the application of heat and/or pressure thereto.

Alternatively, the fourth object of the present invention can be achieved by an image transfer method of transferring to an image receiving material an image formed on the image transfer sheet by transferring a thermofusible ink layer or a sublimable dye imagewise to the image transfer sheet with the application of heat thereto, or an image formed on the image transfer sheet by an ink jet printing method using an aqueous ink or a thermofusible ink.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

A single FIGURE is a microphotograph showing wrinkling of an image holding layer of a conventional image transfer sheet (at a 30× magnification).

DESCRIPTION OF THE PREFERRED EMBODIMENTS

The image transfer sheet of the present invention comprises a support having water permeability, and a releasing layer, an adhesive layer, and an image transfer layer which are overlaid in this order on the support. In the image transfer sheet (1) according to the present invention, the surface covering area ratio of the adhesive layer with respect to the surface area of the image transfer layer is controlled to 90% or more, preferably 92% or more, after the image transfer sheet is immersed in water so as to dissolve the releasing layer and peel away from the support from the image transfer sheet. Alternatively, in the image transfer sheet (2), the surface covering area ratio of the adhesive layer with respect to the surface area of the releasing layer is controlled to 40% or more, preferably in the range of 45 to 70%, in the course of the preparation of the image transfer sheet.

The inventors of the present invention have found that the occurrence of wrinkling of the image transfer layer depends upon the condition of the adhesive layer provided under the image transfer layer. By adjusting the surface covering area ratio of the adhesive layer with respect to the surface area of the image transfer layer or the releasing layer, as mentioned above, the conventional problem of wrinkling can be effectively solved.

In any case of the image transfer sheet (1) or (2) of the present invention, an image is formed on the surface of the image transfer layer, using a toner, an ink, a dye or the like, and then the image-bearing image transfer sheet is immersed in water, so as to dissolve the releasing layer in the water. Thus, the support is peeled away from the adhesive layer, so that a film-like material composed of the image transfer layer backed with the adhesive layer is obtained. The thus obtained film-like material is applied to an image receiving material, whereby the image transfer is carried out.

According to the present invention, there can be obtained an image transfer sheet free of wrinkling when the surface covering area ratio of the adhesive layer with respect to the image transfer layer or the releasing layer is specified as mentioned above.

If the surface covering area ratio of the adhesive layer with respect to the surface area of the releasing layer is less than 40% at the fabrication of the image transfer sheet, many portions of the releasing layer are not covered with the adhesive layer and remain exposed before the image transfer layer is provided on the adhesive layer. When the image transfer layer is overlaid on such an adhesive layer, the image transfer layer comes in contact with the adhesive layer portions and the exposed releasing layer portions. In the case where such an image transfer sheet is immersed in water, the wrinkling of the image transfer layer occurs because the wettability of the adhesive layer portions by water is different from that of the releasing layer portions.

The surface covering area ratio of the adhesive layer with respect to the surface area of the image transfer layer is measured in the following manner. An image transfer sheet is immersed in tap water of 20° C. for 3 minutes, and thereafter a film-like material composed of the adhesive layer and the image transfer layer is carefully peeled away from the support. The adhesive layer side of the film-like material is roughly washed and dried at 20° C. and 65%RH for one day. The adhesive layer side of the film-like material is observed using a commercially available light microscope "MEASURING MICROSCOPE STM" (Trademark), made by Olympus Optical Co., Ltd., at a 30× magnification with the amount of reflected light being controlled to a minimum value. The microphotograph is produced as an image using a commercially available printer "CVP-M3" (Trademark), made by Sony Corporation. The thus obtained image is subjected to image scanning using a commercially available image scanner "JX-250" (Trademark), made by Sharp Corporation, in a full-color mode with a resolution of 100 dpi, and the obtained data is inputted into a commercially available personal computer "750-P100" (Trademark), made by International Business Machines Corporation, that is connected to the above-mentioned image scanner. Using a commercially available Adobe's software "Photoshop" (Trademark), the data obtained by image scanning is two-valued with the threshold being set to 32, so that the ratio of the area of white portions (corresponding to the adhesive layer portions) to the surface area of the image transfer layer is measured.

The method of obtaining the surface covering area ratio of the adhesive layer with respect to the surface area of the releasing layer is as follows: A sample sheet is fabricated by successively providing a releasing layer and an adhesive layer on a support. The adhesive layer side of the thus obtained sample sheet is observed using a commercially available light microscope "MEASURING MICROSCOPE STM" (Trademark), made by Olympus Optical Co., Ltd., at a 30× magnification with the amount of reflected light being controlled to a maximum value. The microphotograph is produced as an image using a commercially available printer "CVP-M3" (Trademark), made by Sony Corporation. The thus obtained image is subjected to image scanning using a commercially available image scanner "JX-250" (Trademark), made by Sharp Corporation, in a gray scale mode with a resolution of 100 dpi, and the obtained data is inputted into a commercially available personal computer "750-P100" (Trademark), made by International Business Machines Corporation, that is connected to the above-mentioned image scanner. Using a commercially available Adobe's software "Photoshop" (Trademark), the data obtained by image scanning is two-valued with the threshold being set to 180, so that the ratio of the area of white portions (corresponding to the adhesive layer portions) to the surface area of the releasing layer is measured.

To increase the surface covering area ratio of the adhesive layer with respect to the surface area of the releasing layer or that of the image transfer layer, it is effective to increase the wettability of the releasing layer by a coating liquid for the formation of the adhesive layer. To be more specific, it is preferable that the adhesive layer be provided on the releasing layer using a coating liquid in the form of a solvent solution for the formation of the adhesive layer. Namely, the releasing layer can be more easily wetted by such a solvent solution because the surface tension of a coating liquid in the form of a solvent solution is lower than an aqueous coating liquid. As a result, the solvent solution for the formation of the adhesive layer can be uniformly coated on the releasing layer.

There is also a method of adding a surfactant to an aqueous coating liquid for lowering the surface tension of the coating liquid for the formation of the adhesive layer.

Alternatively, it is effective to provide the adhesive layer using a high-viscosity coating liquid for the formation of the adhesive layer. This is because cissing can be prevented from occurring in the obtained adhesive layer after such a high-viscosity coating liquid is applied to the releasing layer.

In such a case, it is preferable that the viscosity of the coating liquid for the formation of the adhesive layer be $50 \times 10^{-3}$ Pa·s or more, more preferably $100 \times 10^{-3}$ Pa·s or more, in order to effectively prevent the occurrence of wrinkling of the image transfer layer. The viscosity of the coating liquid is measured using a commercially available viscometer with the coating liquid being set to 20° C.

Thus, the surface covering area ratio of the adhesive layer with respect to the surface areas of the releasing layer and the image transfer layer can be increased to the specified range.

The adhesive layer comprises a pressure-sensitive adhesive.

Specific examples of the pressure-sensitive adhesive for use in the adhesive layer include rubber-based pressure-sensitive adhesives such as natural rubber, styrene/butadiene copolymer rubber, polyisobutylene rubber, isobutylene/isoprene copolymer rubber, styrene/isoprene/styrene block copolymer rubber, styrene/butadiene/styrene block copolymer rubber, chloroprene rubber, butadiene/acrylonitrile copolymer rubber, and polybutadiene rubber; acrylic pressure-sensitive adhesives such as poly(methyl methacrylate), poly(methyl acrylate), poly(ethyl acrylate), poly(butyl acrylate), poly(octyl acrylate) such as poly(2-ethylhexyl acrylate) and copolymers comprising the monomer constituting the above acrylic polymers; vinyl-ether-based pressure-sensitive adhesives such as polyvinyl ethyl ether, polyvinyl butyl ether, and polyvinyl isobutyl ether; and silicone-based pressure-sensitive adhesives such as polydimethyl siloxane. Of these pressure-sensitive adhesives, the acrylic pressure-sensitive adhesives are more preferably employed because the acrylic pressure-sensitive adhesives are superior to the rubber-based pressure-sensitive adhesives in terms of transparency, weatherability, heat resistance, and solvent resistance, and less expensive in comparison with the silicone-based pressure-sensitive adhesives.

It is preferable that the adhesive layer be provided in a deposition amount of 1 $g/m^2$ to 30 $g/m^2$, more preferably 2 g $m^2$ to 20 $g/m^2$ on a dry basis. When the dry deposition amount of the adhesive layer is less than 1 $g/m^2$, the adhesion force of the adhesive layer is insufficient for practical use, and the surface of the releasing layer is not so sufficiently covered with the adhesive layer that the wrinkling of the image transfer layer easily occurs. Meanwhile, when the dry deposition amount of the adhesive layer is more than 30 $g/m^2$, the production cost increases excessively and the pressure-sensitive adhesive used in the adhesive layer oozes therefrom during the preservation of the image transfer sheets, so that the image transfer sheets tend to stick together.

In the case where the coating liquid in the form of a solvent solution is employed for the formation of the adhesive layer, there can be employed as the solvent pentane, n-hexane, cyclohexane, heptane, octane, dichloromethane, chloroform, benzene, toluene, xylene, acetone, methyl ethyl ketone, ethyl acetate, methanol, ethanol, n-propyl alcohol, isopropyl alcohol, n-butyl alcohol, isobutyl alcohol, or t-butyl alcohol.

In the image transfer layer, for example, the following materials can be employed: thermoplastic polyurethane, polyamide, polyester, polyolefin, cellulose derivative such as cellulose nitrate, styrene resins and styrene copolymers such as polystyrene and poly-α-methylstyrene, acrylic resins such as poly(methyl acrylate), poly(methyl methacrylate), poly(ethyl acrylate) and poly(ethyl methacrylate), vinyl copolymers such as vinyl chloride-vinyl acetate copolymer and ethylene-vinyl alcohol copolymer, rosin and rosin ester resins such as rosin-modified maleic acid resin, natural and synthetic rubbers such as polyisoprene rubber and styrene-butadiene rubber, a variety of ionomers, epoxy resin and phenolic resin.

In particular, the preferable materials for the image transfer layer include a polymer comprising at least one monomer selected from the group consisting of ethylene, vinyl acetate, acrylic acid, methacrylic acid and acrylate, or a copolymer comprising at least one of the above-mentioned monomers.

The above-mentioned thermoplastic polyurethane can be obtained from a reaction between an isocyanate derivative and a polyol having hydroxyl groups at an end of the molecule thereof.

The isocyanate derivative includes, for example, aromatic diisocyanates such as tolylene diisocyanate and diphenylmethane-4,4'-diisocyanate; aliphatic cyclic diisocyanates such as isophorone diisocyanate; and aliphatic diisocyanates such as trimethylene diisocyanate, tetramethylene diisocyanate, hexamethylene diisocyanate and dodecamethylene diisocyanate.

The polyol includes polyhydroxy compounds, such as alkane polyol, polyester polyol, and polyether polyol. At least one of the above-mentioned polyhydroxy compounds is used.

Examples of the alkane polyols are alkane diols such as 1,5-pentanediol, 1,8-octanediol, 1,10-decanediol and 1,12-dodecanediol.

The polyester polyol includes aliphatic polyester diols, for example, a polyester diol comprising as a constituent unit at least an aliphatic diol or an aliphatic dicarboxylic acid, which will be explained later.

The polyether polyol includes polyether diols, for example, adducts of diethylene glycol, triethylene glycol, polyethylene glycol, tripropylene glycol, polypropylene glycol, or bisphenol A with an alkylene oxide such as ethylene oxide.

The polyamide used as the material for the image transfer layer includes, for example, nylon 6, nylon 11, nylon 12, nylon 13, nylon 610, nylon 612, nylon 616, and copolymer nylon, such as nylon 6/12, prepared from any of the above nylon materials.

The polyester includes a polyester comprising as a constituent unit at least an aliphatic diol component or an aliphatic dicarboxylic acid component, more preferably, an aliphatic polyester comprising as constituent units both the aliphatic diol component and the aliphatic dicarboxylic acid component. In many cases, a preferable polyester includes a saturated aliphatic dicarboxylic acid component.

Specific examples of the aliphatic diol component used for the preparation of the polyester are ethylene glycol, diethylene glycol, triethylene glycol, polyethylene glycol, propylene glycol, dipropylene glycol, tripropylene glycol, polypropylene glycol, 1,3-butanediol, 1,4-butanediol, neopentyl glycol, 1,6-hexanediol, and polymethylene glycol.

Specific examples of the aliphatic dicarboxylic acid component used for the preparation of the polyester include unsaturated aliphatic dicarboxylic acids such as maleic acid and fumaric acid; and saturated aliphatic dicarboxylic acids such as succinic anhydride, adipic acid, azelaic acid, sebacic acid, suberic acid and dodecanedioic acid.

The polyolefin includes, for example, polyethylenes such as low-density polyethylene and straight-chain low-density polyethylene, ethylene-butene-1 copolymer, ethylene-(4-methylpentene-1) copolymer, ethylene-vinyl acetate copolymer, ethylene-(meth)acrylic acid copolymer, ethylene-(meth)acrylate copolymer, propylene-butene-1 copolymer, ethylene-propylene copolymer, ethylene-propylene-butene-1 copolymer, and modified polyolefin prepared from maleic anhydride. Preferable polyolefins include the modified polyolefin.

Further, the image transfer layer may further comprise a tackifier, an antioxidant, an ultraviolet absorbing agent, a coloring agent, an antistatic agent, a flame-retardant, a wax, a plasticizer and/or a filler when necessary.

It is preferable that the image transfer layer be provided in a deposition amount of 5 g/m$^2$ to 100 g/m$^2$, more preferably 10 g/m$^2$ to 50 g/m$^2$ on a dry basis. When the dry deposition amount of the image transfer layer is less than 5 g/m$^2$, wrinkles are apt to be formed in the image transfer layer due to insufficient strength thereof, and the image transfer layer tends to be torn when bonded to the image receiving material. On the other hand, when the dry deposition amount of the image transfer layer is more than 100 g/m$^2$, transferred images tend to appear unnatural because the image transfer layer is excessively thick, and improper transportation of the image transfer sheet tends to take place when used in a copying apparatus.

The following materials can be used in the releasing layer: synthetic high polymers such as polyvinyl alcohol, polyethylene oxide, polyacrylamide, polyacrylamine, and polyvinyl pyrrolidone; natural starches such as potato starch, tapioca starch, and corn starch, and processed starches prepared by subjecting the above-mentioned starches to an oxidation processing, α-transform processing, etherification processing, or esterification processing; cellulose derivatives such as carboxymethyl-cellulose and methylcellulose; protein; gelatine; glue; casein; shellac; gum arabic; and dextrin.

In the present invention, one releasing layer may be provided on the support. In order to improve the coating properties and the surface smoothness of the image transfer layer, a plurality of releasing layers comprising, for example, a water-soluble material and a filler, may be provided.

It is preferable that the releasing layer be provided in a deposition amount of 1 g/m$^2$ to 50 g/m$^2$ on a dry basis. When the dry deposition amount of the releasing layer is less than 1 g/m$^2$, the support is difficult to be removed from the image transfer sheet in water because the support is partially bonded to the adhesive layer, while when the dry deposition amount of the releasing layer is more than 50 g/m$^2$, a long period of time is required before the releasing layer is dissolved, so that the peeling speed tends to be lowered.

Examples of the support for use in the image transfer sheet of the present invention include a sheet of paper, synthetic paper, cloth, non-woven fabric and leather; a film made of a resin such as polyethylene terephthalate, diacetate cellulose, triacetate cellulose, acrylic polymer, cellophane, celluloid, polyvinyl chloride, polycarbonate, polyimide, polyether sulfone, polyethyl ether ketone, polyethylene or polypropylene; and a metallic plate and metallic foil. In addition, the above-mentioned support materials may be appropriately laminated to prepare a composite sheet, and further, water resistance and electroconductivity may be imparted to the support material by coating or laminating. The material for the support is not particularly limited to the above-mentioned materials.

In particular, a sheet of paper with a basis weight of 20 $g/m^2$ to 200 $g/m^2$ is preferably employed as the support in the present invention from the viewpoints of the cost, the transportation stability in image formation apparatus, and the water permeability thereof.

One of the preferred embodiment of the present invention is to use aqueous emulsions as coating liquids for the formation of the image transfer layer and the adhesive layer, and to use an aqueous solution as a coating liquid for the formation of the releasing layer. This is because the image transfer sheet can be produced at low cost, without causing any air pollution problem, since no organic solvents are used and accordingly there is no evaporation of any organic solvents. With the film formation performance and the coating performance taken into consideration, however, it is possible to employ solvent-using materials for the formation of the image transfer layer and the adhesive layer.

For the formation of the releasing layer, the adhesive layer and the image transfer layer, the materials for each of the above layers are dissolved or dispersed in water or an appropriate solvent, or prepared into an emulsion, thereby obtaining coating liquids for the formation of the releasing layer, the adhesive layer and the image transfer layer. Each of the thus prepared coating liquids may be coated, using a coater such as roll coater, blade coater, wire bar coater, air-knife coater, rod coater, or die coater. Alternatively, a hot-melt coater and a laminate coater are also available.

Images can be formed on the image transfer sheet of the present invention, not only by the electrophoto-graphic recording method, the thermal image transfer recording method using a thermofusible ink or sublimation-type dye, and the ink-jet printing method, as mentioned above, but also by various printing processes such as offset printing, letterpress printing, intaglio printing and stencil printing, and various recording methods such as electrostatic recording, dot impact recording and handwriting.

Other features of this invention will become apparent in the course of the following description of exemplary embodiments, which are given for illustration of the invention and are not intended to be limiting thereof.

EXAMPLE 1

[Formation of Releasing Layer]

The following components were mixed to prepare a coating liquid for the formation of a releasing layer:

|  | Parts by Weight |
| --- | --- |
| Polyvinyl alcohol (Trademark "KL-506", made by Kuraray Co., Ltd.) | 20 |
| Water | 80 |

Using a wire bar, the above prepared coating liquid for the formation of the releasing layer was coated on one side of a sheet of high quality paper with a basis weight of 93 $g/m^2$ serving as a support, and dried. Thus, a releasing layer was provided on the support in a deposition amount of 11 $g/m^2$ on a dry basis.

[Formation of Adhesive Layer]

The following components were mixed to prepare a coating liquid for the formation of an adhesive layer:

|  | Parts by Weight |
| --- | --- |
| 2-ethylhexyl acrylate | 45 |
| Butyl acrylate | 20 |
| Vinyl acetate | 18 |
| Ethyl acrylate | 15 |
| Itaconic acid | 2 |
| Toluene | 236 |
| Ethyl acetate | 236 |

The viscosity of the above-prepared coating liquid for the formation of the adhesive layer was $266 \times 10^{-3}$ Pa·s. This coating liquid was coated on the release layer by a wire bar and dried, so that an adhesive layer was provided on the releasing layer in a deposition amount of 8 $g/m^2$ on a dry basis.

[Formation of Image Transfer Layer]

The following components were mixed to prepare a coating liquid for the formation of an image transfer layer:

|  | Parts by Weight |
| --- | --- |
| Butyl acrylate | 23 |
| Ethyl acrylate | 47 |
| Acrylonitrile | 30 |
| Water | 92 |

The above-prepared acrylic-based coating liquid for the formation of the image transfer layer was coated on the adhesive layer by a wire bar, and dried, so that an image transfer layer was provided on the adhesive layer in a deposition amount of 53 $g/m^2$ on a dry basis, whereby an image transfer sheet No. 1 of the present invention was obtained.

There was no wrinkling on the image transfer layer of the image transfer sheet No. 1.

Using a commercially available color copying machine "PRETER 550" (Trademark), made by Ricoh Company, Ltd., a full-color image was formed on the image transfer layer side of the above prepared image transfer sheet No. 1.

The full-color image thus formed was remarkably clear and of high quality, which was of the same high quality as that of an image formed on a sheet of plain paper for exclusive use for the above-mentioned color copying machine "PRETER 550".

Furthermore, the above prepared image transfer sheet No. 1 of the present invention was immersed in water, and the support was peeled away therefrom, so that a film-like material composed of the adhesive layer and the image transfer layer was obtained. The thus obtained film-like material was placed on an acrylic resin plate, with the adhesive layer in close contact with the acrylic resin plate. Water was squeezed off from the gap between the image-bearing image transfer sheet No. 1 and the acrylic resin plate using a blade, and the transferred image was dried. The result was that the image-bearing image transfer layer was firmly bonded to the acrylic resin plate.

EXAMPLE 2

The procedure for preparation of the image transfer sheet No. 1 of the present invention in Example 1 was repeated except that the formulation for the coating liquid for the formation of the adhesive layer in Example 1 was changed as follows:

|  | Parts by Weight |
| --- | --- |
| 2-ethylhexyl acrylate | 45 |
| Butyl acrylate | 20 |
| Vinyl acetate | 18 |
| Ethyl acrylate | 13 |
| Itaconic acid | 4 |
| Toluene | 213 |
| Hexane | 71 |

The viscosity of the above-prepared coating liquid for the formation of the adhesive layer was $169 \times 10^{-3}$ Pa·s.

Thus, an image transfer sheet No. 2 of the present invention was prepared.

EXAMPLE 3

The procedure for preparation of the image transfer sheet No. 1 of the present invention in Example 1 was repeated except that the formulation for the coating liquid for the formation of the adhesive layer in Example 1 was changed as follows:

|  | Parts by Weight |
| --- | --- |
| 2-ethylhexyl acrylate | 80 |
| Methyl methacrylate | 15 |
| Itaconic acid | 10 |
| Water | 105 |

The viscosity of the above-prepared coating liquid for the formation of the adhesive layer was $456 \times 10^{-3}$ Pa·s.

Thus, an image transfer sheet No. 3 of the present invention was prepared.

EXAMPLE 4

The procedure for preparation of the image transfer sheet No. 3 of the present invention in Example 3 was repeated except that the dry deposition amount of the adhesive layer was changed from 8 g/m² to 1 g/m², whereby an image transfer sheet No. 4 of the present invention was prepared.

EXAMPLE 5

The procedure for preparation of the image transfer sheet No. 3 of the present invention in Example 3 was repeated except that the dry deposition amount of the adhesive layer was changed from 8 g/m² to 16 g/m², whereby an image transfer sheet No. 5 of the present invention was prepared.

COMPARATIVE EXAMPLE 1

The procedure for preparation of the image transfer sheet No. 1 of the present invention in Example 1 was repeated except that the formulation for the coating liquid for the formation of the adhesive layer in Example 1 was changed as follows:

|  | Parts by Weight |
| --- | --- |
| 2-ethylhexyl acrylate | 80 |
| Methyl methacrylate | 15 |
| Itaconic acid | 10 |
| Water | 234 |

The viscosity of the above-prepared coating liquid for the formation of the adhesive layer was $31 \times 10^{-3}$ Pa·s.

Thus, a comparative image transfer sheet No. 1 was prepared.

Each of the image transfer sheets No. 1 to No. 5 according to the present invention prepared in Examples 1 to 5 and the comparative image transfer sheet No. 1 prepared in Comparative Example 1 was immersed in water to remove the support from the image transfer sheet.

Then, the surface covering area ratio of the adhesive layer with respect to the surface area of the image transfer layer was measured in the previously mentioned manner.

Further, in the course of the preparation of each image transfer sheet, the surface covering area ratio of the adhesive layer with respect to the surface area of the releasing layer was measured in the previously mentioned manner.

A full-color image was formed on the image transfer layer side of each image transfer sheet using the above-mentioned commercially available color copying machine "PRETER 550" (Trademark), made by Ricoh Company, Ltd. The image-bearing image transfer sheet was immersed in water of 20° C. to peel the support from each image transfer sheet. The thus obtained film-like material composed of the adhesive layer and the image-bearing image transfer layer was applied to an acrylic resin plate. At that time, occurrence of wrinkling on the image transfer layer was visually inspected.

The results are shown in TABLE 1.

TABLE 1

|  | Surface Covering Area Ratio of Adhesive Layer with respect to Releasing Layer (%) | Surface Covering Area Ratio of Adhesive Layer with respect to Image Transfer Layer after Peeling of Support (%) | Occurrence of Wrinkling on Image Transfer Layer |
| --- | --- | --- | --- |
| Ex. 1 | 51.3 | 92.7 | None |
| Ex. 2 | 48.6 | 92.7 | None |
| Ex. 3 | 51.8 | 93.7 | None |
| Ex. 4 | 43.1 | 92.1 | None |
| Ex. 5 | 68.7 | 94.4 | None |
| Comp. Ex. 1 | 33.4 | 87.8 | Wrinkling was observed. |
|  |  | about 90–94.4 |  |

As previously explained, according to the present invention there can be obtained a high quality image transfer sheet free of wrinkling of the image transfer layer.

Japanese Patent Application No. 10-153966 filed May 19, 1998, is hereby incorporated by reference.

What is claimed is:

1. An image transfer sheet, comprising a support having water permeability, a releasing layer, an adhesive layer, comprising a pressure-sensitive adhesive material, and an image transfer layer that are successively overlayed in this order on the support, the adhesive layer having a surface covering area ratio of about 90 to 94.4% with respect to a surface area of the image transfer layer when the image transfer sheet is immersed in water and the support is peeled away therefrom.

2. The image transfer sheet of claim 1, wherein said pressure-sensitive adhesive comprises rubber-based pressure-sensitive adhesives, acrylic-based pressure-sensitive adhesives, vinyl-ether-based pressure-sensitive adhesives or silicone-based pressure-sensitive adhesives.

3. The image transfer sheet of claim 1, wherein said adhesive layer is provided in a deposition amount of 1 to 30 g/m² on a dry basis.

4. The image transfer sheet of claim 1, wherein said adhesive layer is provided using a coating liquid in the form of a solvent solution for the formation of said adhesive layer.

5. The image transfer sheet of claim 2, wherein said pressure-sensitive adhesive comprises acrylic-based pressure-sensitive adhesives.

6. The image transfer sheet of claim 1, wherein said adhesive layer is provided in a deposition amount of 2 to 20 g/m² on a dry basis.

7. The image transfer sheet of claim 5, wherein said acrylic pressure-sensitive adhesives comprise poly(methyl methacrylate), poly(methyl acrylate), poly(ethyl acrylate), poly(butyl acrylate) or poly(octyl acrylate).

8. The image transfer sheet of claim 1, wherein the image transfer layer comprises thermoplastic polyurethane, polyamide, polyester, polyolefin, cellulose or a compound thereof, styrene resins or copolymer thereof, acrylic resins, vinyl copolymer, rosin or rosin ester resins, natural or synthetic rubbers, epoxy resin or phenolic resin.

9. The image transfer sheet of claim 4, wherein said solution comprises a solvent selected from the group consisting of pentane, hexane, cyclohexane, heptane, octane, dichloromethane, chloroform, benzene, toluene, xylene, acetone, methyl ethyl ketone, ethyl acetate, methanol, ethanol, n-propyl alcohol, isopropyl alcohol, n-butyl alcohol isobutyl alcohol and t-butyl alcohol.

10. The image transfer sheet of claim 8, wherein the image transfer layer comprises a polymer of at least one monomer selected from the group consisting of ethylene, vinyl acetate, acrylic acid, methacrylic acid and acrylate, and copolymers thereof.

11. The image transfer sheet of claim 1, wherein the image transfer layer is provided in a deposition amount of from 5 to 100 g/m² on a dry basis.

12. The image transfer sheet of claim 11, wherein the image transfer layer is provided in a deposition amount of from 10 to 50 g/m² on a dry basis.

13. The image transfer sheet of claim 1, wherein the releasing layer is provided in a deposition amount of from 1 to 50 g/m² on a dry basis.

14. The image transfer sheet of claim 1, wherein the support comprises paper, cloth, non-woven fabric, leather, metallic plate, metallic foil, or a resin film.

15. The image transfer sheet of claim 14, wherein the support comprises a sheet of paper having a basis weight of 20 to 200 g/m².

16. The image transfer sheet of claim 1, wherein the adhesive layer has a surface covering area ratio of from 92.1 to 94.4%.

17. The image transfer sheet of claim 16, wherein said surface covering area ratio of adhesive layer is from 43.1 to 68.7% with respect to the releasing layer.

18. A method of preparing an image transfer sheet, comprising a support having water permeability, a releasing layer, an adhesive layer comprising a pressure-sensitive adhesive material, and an image transfer layer which are successively overlaid in this order on said support, the adhesive layer having a surface covering area ratio of about 90 to 94.4% with respect to a surface area of said image transfer layer when said image transfer sheet is immersed in water and said support is peeled away therefrom; said method comprising providing said adhesive layer on said releasing layer using a coating liquid in the form of a solvent solution for the formation of said adhesive layer.

19. The method of claim 18, wherein said adhesive layer of said image transfer sheet comprises an acrylic pressure-sensitive adhesive.

20. The method of claim 18, wherein said adhesive layer is provided in a deposition amount of 1 g/² to 30 g/m² on a dry basis.

21. A method of preparing an image transfer sheet, comprising a support having water permeability, a releasing layer, an adhesive layer comprising a pressure-sensitive adhesive material, and an image transfer layer which are successively overlaid in this order on said support, the adhesive layer having a surface covering area ratio of about 90 to 94.4% with respect to a surface area of said image transfer layer when said image transfer sheet is immersed in water and said support is peeled away therefrom, said method comprising providing said adhesive layer on said releasing layer using a coating liquid with a viscosity of $50 \times 10^{-3}$ Pa·s or more for the formation of said adhesive layer.

22. The method of claim 21, wherein said adhesive layer of said image transfer sheet comprises an acrylic pressure-sensitive adhesive.

23. The method of claim 21, wherein said adhesive layer is provided in a deposition amount of 1 g/m² to 30 g/m² on a dry basis.

24. A method of forming a toner image on an image transfer sheet serving as an image receiving material by electrophotography, which comprises forming said toner image, and fixing said tomer image to said image transfer sheet with the application of heat of pressure or both thereto, said image transfer sheet comprising a support having water permeability, a releasing layer, an adhesive layer comprising a pressure-sensitive adhesive layer and an image transfer layer which are successively overlaid in this order on said support, the adhesive layer having a surface covering area ratio of about 90 to 94.4% with respect to a surface area of said image transfer layer when said image transfer sheet is immersed in water and said support is peeled away therefrom.

25. The image formation method of claim 24, wherein said adhesive layer of said image transfer sheet comprises an acrylic pressure-sensitive adhesive.

26. The image formation method of claim 24, wherein said adhesive layer is provided in a deposition amount of 1 g/m² to 30 g/m² on a dry basis.

27. An image formation method of forming an image on an image transfer sheet serving as an image receiving material by an ink jet printing method using an aqueous ink or thermofusible ink, said image transfer sheet comprising a support having a water permeability, a releasing layer, an adhesive layer comprising a pressure-sensitive adhesive and an image transfer layer which are successively overlaid in this order on said support, the adhesive layer having a surface covering area ratio of about 90 to 94.4% with respect to a surface area of said image transfer layer when said image transfer sheet is immersed in water and said support is peeled away therefrom.

28. The image formation method of claim 27, wherein said adhesive layer of said image transfer sheet comprises an acrylic pressure-sensitive adhesive.

29. The image formation method of claim 27, wherein said adhesive layer is provided in a deposition amount of 1 g/m² to 30 g/m² on a dry basis.

30. The image formation method of forming an image transfer sheet serving as an image receiving material by transferring a thermofusible ink layer or a sublimable dye imagewise to said image transfer sheet with the application of heat thereto, said image transfer sheet comprising a support having water permeability, and a releasing layer, an adhesive layer comprising a pressure-sensitive adhesive transfer layer which are successively overlaid in this order on said support, the adhesive layer having a surface covering area ratio of about 90% to 94.4% with respect to a surface area of said image transfer layer when said image transfer sheet is immersed in water and said support is peeled away therefrom.

31. The image formation method of claim 30, wherein said adhesive layer of said image transfer sheet comprises an acrylic pressure-sensitive adhesive.

32. The image formation method of claim 30, wherein said adhesive layer is provided in a deposition amount of 1 g/m² to 30 g/m² on a dry basis.

33. An image transfer method of transferring to an image receiving material, a toner image which is formed by electrophotography on an image transfer sheet and fixed thereto with the application of heat or pressure or both thereto, said image transfer sheet comprising a support having water permeability, and a releasing layer, an adhesive layer comprising a pressure-sensitive adhesive, and an image transfer layer which are successively overlaid in this order on said support, with said adhesive layer having a surface covering area ratio of about 90 to 94.4% with respect to a surface area of said image transfer layer when said image transfer sheet is immersed in water and said support is peeled away therefrom.

34. The image transfer method of claim 33, wherein said adhesive layer of said image transfer sheet comprises an acrylic pressure-sensitive adhesive.

35. The image transfer method of claim 33, wherein said adhesive layer is provided in a deposition amount of 1 g/m² to 30 g/m² on a dry basis.

36. An image transfer method of transferring an image formed on an image transfer sheet to an image receiving material, said image being formed on said image transfer sheet by transferring a thermofusible ink layer or a sublimable dye imagewise to said image transfer sheet with the application of heat thereto, said image transfer sheet comprising a support having water permeability, a releasing layer, an adhesive layer comprising a pressure-sensitive adhesive, and an image transfer layer which are successively overlaid in this order on said support, the adhesive layer having a surface covering area ratio of about 90 to 94.4% with respect to a surface area of said image transfer layer when said image transfer layer sheet is immersed in water and said support is peeled away therefrom.

37. The image transfer method of claim 36, wherein said adhesive layer of said image transfer sheet comprises an acrylic pressure-sensitive adhesive.

38. The image transfer method of claim 36, wherein said adhesive layer is provided in a deposition amount of 1 g/m² to 30 g/m² on a dry basis.

39. An image transfer method of transferring an image formed on an image transfer sheet to an image receiving material, said image being formed on said image transfer sheet by an ink jet printing method using an aqueous ink or a thermofusible ink, said image transfer sheet comprising a support having water permeability, a releasing layer, an adhesive layer comprising a pressure-sensitive adhesive, and an image transfer layer which are successively overlaid in this order on said support, the adhesive layer having a surface covering area ration of about 90 to 94.4%, with respect to a surface area of said image transfer layer when said image transfer sheet is immersed in water and said support is peeled away therefrom.

40. The image transfer method of claim 39, wherein said adhesive layer of said image transfer sheet comprises an acrylic pressure-sensitive adhesive.

41. The image transfer method of claim 39, wherein said adhesive layer is provided in a deposition amount of 1 g/m² to 30 g/m² on a dry basis.

* * * * *

UNITED STATES PATENT AND TRADEMARK OFFICE
CERTIFICATE OF CORRECTION

PATENT NO. : 6,284,349 B1
DATED : September 4, 2001
INVENTOR(S) : Shigeo Hatada et al.

It is certified that error appears in the above-identified patent and that said Letters Patent is hereby corrected as shown below:

Column 6,
Line 41, "g m$^2$" should read -- g/m$^2$ --.

Column 13,
Table 1,

"
TABLE 1

| | Surface Covering Area Ratio of Adhesive Layer with respect to Releasing Layer (%) | Surface Covering Area Ratio of Adhesive Layer with respect to Image Transfer Layer after Peeling of Support (%) | Occurrence of Wrinkling on Image Transfer Layer |
|---|---|---|---|
| Ex. 1 | 51.3 | 92.7 | None |
| Ex. 2 | 48.6 | 92.7 | None |
| Ex. 3 | 51.8 | 93.7 | None |
| Ex. 4 | 43.1 | 92.1 | None |
| Ex. 5 | 68.7 | 94.4 | None |
| Comp. Ex. 1 | 33.4 | 87.8 | Wrinkling was observed |
| | | about 90-94.4 | |

"

should read,

--
TABLE 1

| | Surface Covering Area Ratio of Adhesive Layer with respect to Releasing Layer (%) | Surface Covering Area Ratio of Adhesive Layer with respect to Image Transfer Layer after Peeling of Support (%) | Occurrence of Wrinkling on Image Transfer Layer |
|---|---|---|---|
| Ex. 1 | 51.3 | 92.7 | None |
| Ex. 2 | 48.6 | 92.7 | None |
| Ex. 3 | 51.8 | 93.7 | None |
| Ex. 4 | 43.1 | 92.1 | None |
| Ex. 5 | 68.7 | 94.4 | None |
| Comp. Ex. 1 | 33.4 | 87.8 | Wrinkling was observed |

--

Line 51, "claim 1" should read -- claim 3 --.

UNITED STATES PATENT AND TRADEMARK OFFICE
CERTIFICATE OF CORRECTION

PATENT NO. : 6,284,349 B1
DATED : September 4, 2001
INVENTOR(S) : Shigeo Hatada et al.

It is certified that error appears in the above-identified patent and that said Letters Patent is hereby corrected as shown below:

Column 14,
Line 4, "n-butyl alcohol" should read -- n-butyl alcohol, --; and
Line 51, " "1 g/$^2$" should read -- 1 g/m$^2$ --.

Column 15,
Line 10, "tomer" should read -- toner --.

Column 16,
Line 54, "ration" should read -- ratio --.

Signed and Sealed this

Twenty-eighth Day of May, 2002

Attest:

JAMES E. ROGAN
*Attesting Officer*   *Director of the United States Patent and Trademark Office*